United States Patent
Howard et al.

(10) Patent No.: US 10,360,024 B2
(45) Date of Patent: *Jul. 23, 2019

(54) METHOD AND APPARATUS FOR EXECUTION OF DISTRIBUTED WORKFLOW PROCESSES

(71) Applicant: Kersplody Corporation, Broomfield, CO (US)

(72) Inventors: Christopher Eric Harold Howard, Broomfield, CO (US); Timothy Mechigian Gruhl, Palmdale, CA (US)

(73) Assignee: Kersplody Corporation, Broomfield, CO (US)

( * ) Notice: Subject to any disclaimer, the term of this patent is extended or adjusted under 35 U.S.C. 154(b) by 220 days.

This patent is subject to a terminal disclaimer.

(21) Appl. No.: 15/436,560

(22) Filed: Feb. 17, 2017

(65) Prior Publication Data

US 2017/0177331 A1     Jun. 22, 2017

Related U.S. Application Data

(63) Continuation of application No. 14/973,010, filed on Dec. 17, 2015, now Pat. No. 9,575,749.

(51) Int. Cl.
    *G06F 9/445*     (2018.01)
    *G06F 8/71*     (2018.01)
    *G06F 16/245*     (2019.01)
    *G06F 11/30*     (2006.01)
    *G06F 16/25*     (2019.01)

(52) U.S. Cl.
    CPC .............. *G06F 8/71* (2013.01); *G06F 9/44505* (2013.01); *G06F 9/44521* (2013.01); *G06F 11/302* (2013.01); *G06F 16/245* (2019.01); *G06F 16/25* (2019.01)

(58) Field of Classification Search
None
See application file for complete search history.

(56) References Cited

U.S. PATENT DOCUMENTS

| | | | |
|---|---|---|---|
| 6,256,676 B1 | 7/2001 | Taylor et al. | |
| 6,636,900 B2 | 10/2003 | Abdelnur | |

(Continued)

OTHER PUBLICATIONS

TensorFlow: Large-Scale Machine Learning on Heterogeneous Distributed Systems (Preliminary White Paper, Nov. 9, 2015).

(Continued)

*Primary Examiner* — Philip Wang
(74) *Attorney, Agent, or Firm* — J D Harriman; Foundation Law Group

(57) ABSTRACT

The system provides a method and apparatus for the dynamic distribution, deployment, and configuration of optimizable code modules for use with software workflows running on a single compute device or across a network connected grid of compute devices. The system comprises one or more collections of software and data modules stored in a content catalog, conforming to a defined interface, and having metadata conforming to a schema that enables the modules to be statically or dynamically optimized by the controlling workflow and a workflow manager. The system provides a service that enables code modules to be located, deployed, configured, and updated by the controlling workflow, the workflow manager, or a remote manager.

25 Claims, 7 Drawing Sheets

(56) References Cited

U.S. PATENT DOCUMENTS

| | | | |
|---|---|---|---|
| 7,810,099 B2* | 10/2010 | Dettinger | G06Q 10/10 718/106 |
| 7,979,870 B1* | 7/2011 | Pulsipher | H04L 29/08648 709/201 |
| 8,423,950 B2* | 4/2013 | Dettinger | G06F 9/5038 705/7.27 |
| 2008/0114870 A1 | 5/2008 | Pu | |
| 2010/0205475 A1 | 8/2010 | Ebrahimi et al. | |
| 2011/0061057 A1 | 3/2011 | Harris et al. | |
| 2013/0290957 A1 | 10/2013 | Li et al. | |
| 2013/0290976 A1* | 10/2013 | Cherkasova | G06F 9/5038 718/104 |
| 2013/0318538 A1* | 11/2013 | Verma | G06F 9/50 718/104 |
| 2015/0095308 A1* | 4/2015 | Kornacker | G06F 16/258 707/718 |
| 2015/0227389 A1* | 8/2015 | Chin | G06F 9/4881 718/106 |
| 2015/0269001 A1* | 9/2015 | Balmin | G06F 9/5027 718/104 |
| 2015/0370603 A1* | 12/2015 | Fuller | G06F 9/5011 718/104 |
| 2016/0034482 A1* | 2/2016 | Liu | G06F 16/182 707/736 |
| 2016/0072726 A1* | 3/2016 | Soni | H04L 41/147 709/208 |
| 2016/0103695 A1* | 4/2016 | Udupi | G06F 9/45558 718/1 |
| 2017/0060574 A1 | 3/2017 | Malladi et al. | |

OTHER PUBLICATIONS

International Search Report and Written Opinion issued in PCT/US16/67282 dated Mar. 2, 2017.

* cited by examiner

METHOD AND APPARATUS FOR EXECUTION OF DISTRIBUTED WORKFLOW PROCESSES

CLAIM OF BENEFIT TO PRIOR APPLICATIONS

This application claims the benefit of priority from U.S. patent application Ser. No. 14/973,010, entitled "METHOD AND APPARATUS FOR EXECUTION OF DISTRIBUTED WORKFLOW PROCESSES," filed on Dec. 17, 2015.

BACKGROUND OF THE SYSTEM

The system generally relates to workflow processing and, more particularly to optimizing workflow execution by making intelligent decisions regarding how operations used by the workflow can be provided using modules that are dynamically loaded and continuously optimized in response to changes in system and network resource availability.

Workflow processing technologies related to big data systems, including Apache MapReduce, Apache Storm, and Apache Spark, and the like, are typically defined by a set of processing operations, enabling these operations to be run in a defined sequence on a single processing device or a grid of processing devices to accomplish a processing goal. Workflow implementations are typically driven from a workflow definition that primarily focuses on moving data from one operation to another. Workflow operations will typically be managed centrally by a workflow management platform such as Apache Yarn, Apache Mesos, or the like, and be optimized across one or more systems on a compute grid and share a common data store. This implementation works well as long as the systems are in close proximity and have predictable network availability, throughput, and system resources including memory, storage, and processing.

A disadvantage with this workflow processing approach arises when grid processing devices are not in close proximity, have limited and variable network links between each processing system, and/or have rapid changes to system resources available for workflow processing. Because of this, it is challenging or impossible for these systems to utilize a common data store or to optimize workflows that span multiple processing devices. This challenge is even more pronounced when the bulk data originates at the processing devices and that data must be reduced so that it can be transmitted over network links to be utilized by other compute devices on the grid and/or archived centrally. This illustrates the big-data, little-networks problem experienced by highly distributed computing systems, particularly those involved with remote sensing.

For example, a fleet of aircraft, each carrying a LIDAR sensor and a camera, collect geospatial collections. Limitations in quantity of devices, quality of sensor data transmitted, usability of data, latency of data transmission, changes in priorities, or changing network conditions may limit algorithmic exploitation of those collections, especially at the time of collection.

Traditionally this has been solved by static deployment of specially developed or ported code. These capabilities are encumbered by long development cycles, complete software rewrites, and quality assurance processes. This approach is slow, expensive, inflexible, and does not respond to changing resource availability. This approach also effectively puts the data users at the end of data collection workflows instead of participating during the data collection process, consequently slowing down their ability to react as information needs change. With the explosion of the number and complexity of remote sensing devices, many of which are connected to the Internet of Things, this challenge is becoming more widespread.

By managing resource utilization at the module level, existing workflow engines can, without modification, execute workflows with significant improvements to responsiveness across a number of workflows competing for similar resources, particularly when those resources cannot be reallocated to other processing devices on a grid, such as processing camera data from a camera attached to a processing device.

SUMMARY

The system provides a method and apparatus for the dynamic distribution, deployment, and configuration of optimizable code modules for use with software workflows running on a single compute device or across a network connected grid of compute devices. The system comprises one or more collections of software and data modules stored in a content catalog, conforming to a defined interface, and having metadata conforming to a schema that enables the modules to be statically or dynamically optimized by the controlling workflow and a workflow manager. The system provides a service that enables code modules to be located, deployed, configured, and updated by the controlling workflow, the workflow manager, or a remote manager.

DETAILED DESCRIPTION OF THE SYSTEM

Figure 1:
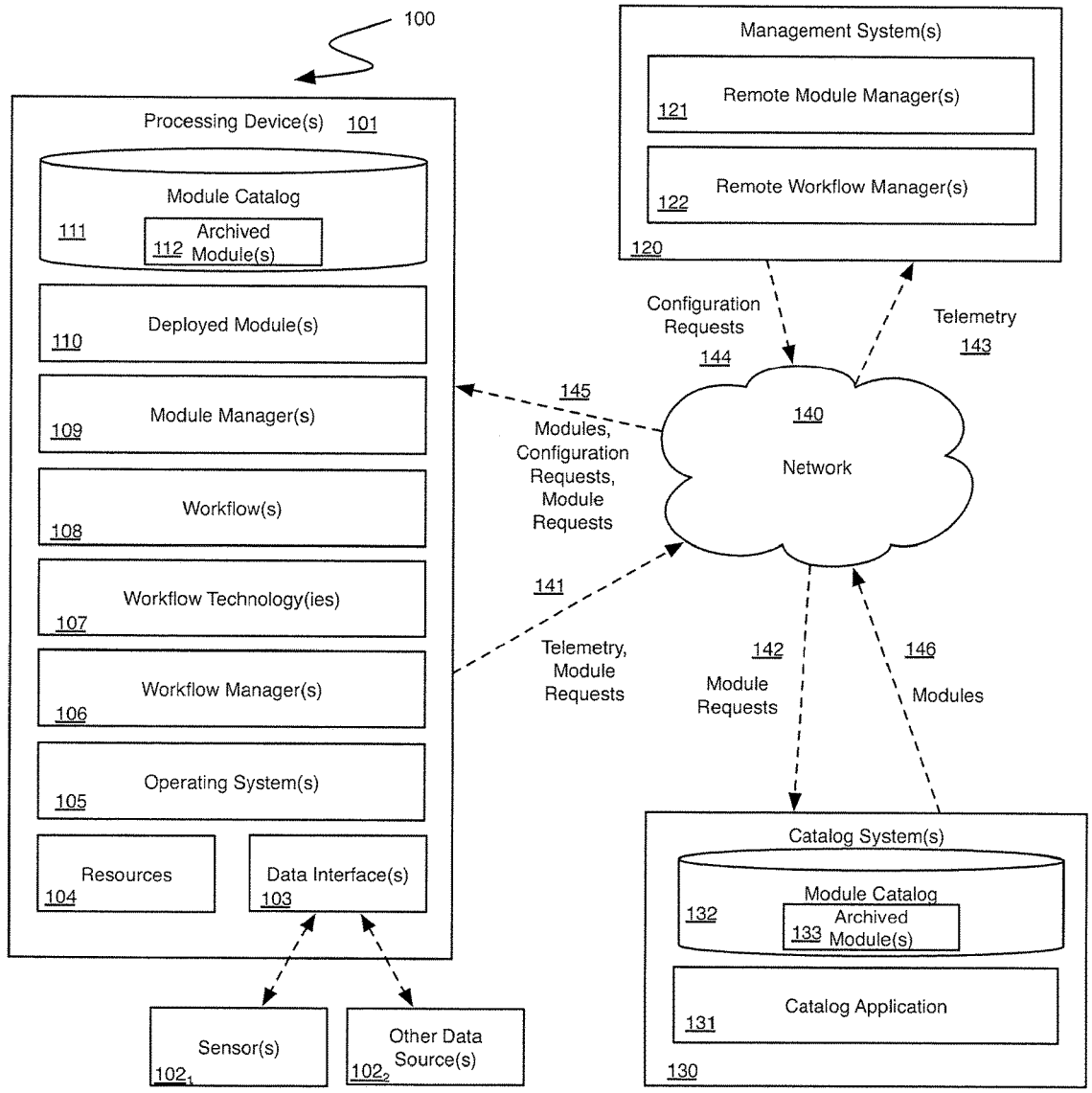
FIG. 1 is an illustration of an embodiment showing a system with workflow deployable optimizable distributable software modules with an optional network environment.

The system provides dynamically deployed processes and algorithms to provide an improved way to distribute rapidly upgradeable and deployable digital assets. In one embodiment, and by way of example, the system is described in connection with providing cyber-security for networks and enterprises. However, the system is not limited to this application, and has equal use in any environment where dynamically deployable digital assets are desired.

Embodiments of the system provide methods and apparatus to deploy optimizable distributable software modules to compute workflows. In one embodiment each workflow consists of a sequence of operations using data and code packaged as modules and any additional logic required to implement a workflow's task or function. In operation, a module manager may be configured to update the configuration of individual modules in a manner that takes into account information about other modules used by any workflow on the local and networked system. Unlike conventional systems that manage resources at the workflow level, individual modules utilized by a workflow in the system can be adjusted to provide a consistent quality of service for users interacting with the processing device. This can be consistent even when resource conditions rapidly change, such as when network conditions degrade, system load levels increase, or a network connection to a centralized workflow manager is temporarily interrupted. Utilizing information about each module combined with embedded mathematical resource utilization models contained in module metadata, the module manager may more optimally reconfigure module configurations to adapt to compute resources currently available on the processing device or across a grid of processing devices, implementing a system that can rapidly adapt to changing priorities and operating conditions, thus maximizing the information produced by the system as a whole.

In one embodiment, the term grid computing system generally refers to a connected group of pooled processing devices each having computing resources (e.g. processing units, memory, and/or software components). Each processing device can consist of any combination of dedicated servers, general purpose (e.g. desktop) computers, mobile or handheld computing devices, embedded systems (inclusive of Internet of Things [IoT] devices), and the like. A single computer, server, embedded system, or the like can consist of multiple processing devices each containing embodiments of this system. Workflows executed on a grid can be controlled by one or more managed workflow processing systems that manage workflow execution across one or more processing devices.

As used herein, the term workflow generally refers to software that executes a series of data processing steps to achieve a desired result. Many of these processing steps utilize code and data stored in modules. In some embodiments, module management may occur using functionality contained in the workflow manager, effectively treating a workflow as a module.

As used herein, the term module generally refers to data constructs consisting of code or data with associated metadata that is capable of being used unmodified across multiple workflow technologies. This module metadata describes the binary content of the module.

In the following, reference is made to embodiments of the system. It should be understood, however, that the system is not limited to any specific embodiments described herein. Instead, any combination of the following features and elements, whether related to different embodiments or not, is contemplated to implement and practice the system. Furthermore, in various embodiments the system provides numerous advantages over the prior art. However, although embodiments of the system may achieve advantages over other possible solutions and/or over the prior art, whether a particular advantage is achieved by a given embodiment is not limiting of the system.

Embodiments can be executed in a single computer (e.g. a processing device) or in multiple computers, e.g. between a client and one or more servers across a network connection. Embodiments can also be executed in any suitable processing environment, including, but not limited to, desktop computing systems, server based computing systems, cloud based computing systems, mobile computing systems including laptops, tablet computers, mobile and cellular devices, smartphones, embedded devices, Google Glass, watch based computing systems, processing nodes, IoT devices, pad devices, network connected medical devices, and the like.

An Exemplary Networked Computing Environment

FIG. 1 is an illustration that depicts a networked computing environment 100, in which embodiments of the system may be utilized. As illustrated, the environment 100 may include one or more Processing Devices 101 connected to a Network 140 that connects to one or more remote servers including additional Processing Devices 101, Management Systems 120, and Catalog Systems 130. Each server or Device 101, 120, or 130 may be any suitable type of computer system or processing system, such as noted above.

The exact type and number of servers will vary depending on the overall requirements of the system, thus network links 141, 142, 143, 144, 145, and 146 are not always present and are signified by dashed lines. The method of the system can be executed on a single Processing Device 101, multiple Processing Devices, 101, or as part of a managed workflow processing system with one or more Processing Devices 101, one or more Management Systems 120, and one or more Catalog Systems 130.

As shown in FIG. 1, a Processing Device 101 in one embodiment consists of a set of services to manage and execute Workflows 108. These services include one or more Operating Systems 105, Data Interfaces 103, Sensors $102_1$, Other Data Sources $102_2$, Workflow Managers 106, Workflow Technologies 107, Workflows 108, Module Managers 109, Deployed Modules 110, Module Catalogs 111 that store and index Archived Modules 112, and consumable system Resources 104.

The arrangement depicted represents one embodiment of an arrangement of components used in grid processing systems. A Workflow Manager 106 runs on an Operating System 105 and executes one or more Workflow Technologies 107 on which Workflows 108 made for specific Workflow Technologies 107 can be executed. Each Workflow 108 uses data internal to the system or consumes data through a Data Interface 103 that enables Sensors $102_1$ and Other Data Sources $102_2$ to be consumed. For example, Sensors $102_1$ and Other Data Sources $102_2$ can consist of any device producing a data stream (Vision, Temperature, GPS, and the like) and connected directly or over a network.

Workflows 108 consume system Resources 104 (Memory, Storage, Network, and the like) and use deployed data and code Modules 110 that were loaded using a Module Catalog 111 that stores archived versions of Modules 112. Module Manager 109 provides an interface that orchestrates the interactions between Deployed Modules 110 and Workflows 108 while managing and monitoring module execution, configurations, and interfaces. In some embodiments, the Module Manager 109 will contain a local optimizer to enable Module optimization given system operational goals and available resources.

When deployed as part of a managed workflow processing grid, Network 140 is utilized to enable Processing Devices 101 to be utilized more fully. Telemetry 141, 143, inclusive of Workflow 108 and Module 110 state, is sent via a push or pull mechanism to a Management System 120 or a plurality of Management Systems 120 via the Network 140. This enables workflow execution to be managed by a Remote Workflow Manager 122 and enables Deployed Modules 110 used by those Workflows 108 to be managed by a Remote Module Manager 121. Configuration Requests 144, inclusive of workflow management (start, stop, restart, and the like), module configuration changes, and workflow manager configuration changes are sent over the Network 144, 140, 145 to one or more Processing Devices 101.

If a Workflow 108 running on a Processing Device 101 is unable to locate a required Archived Module 112 in the local Module Catalog 111, a remote Module Catalog 111 running on a peer Processing Device 101, or a dedicated Catalog System 130 can be queried via the Network 141, 140, 142 or 145. In this case a Catalog Application 131 queries a Module Catalog 132 for one or more indexed Archived Modules 133 via a pull request. If located, the remote Archived Module 133 can be transferred and archived into the local Module Catalog 111 via the Network 146, 140, 145. Each Module Catalog 111, 132 can also push Archived Modules 133, 112 to peer Module Catalogs 132, 111 to improve Workflow 108 startup time and to optimize Network 140 use.

Figure 2:
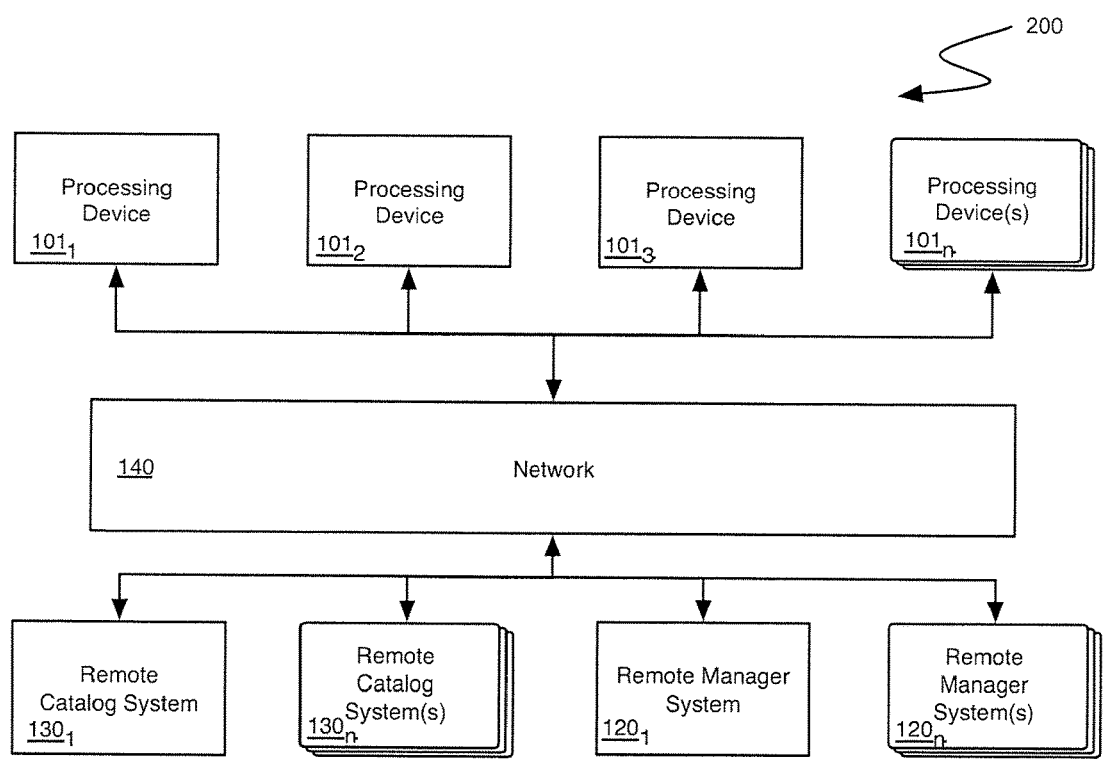
FIG. 2 is a block diagram that illustrates how the components of a system with optimizable distributable software modules connect to a network in an embodiment of the system.

FIG. 2 is a diagram of an embodiment 200 showing a computer system with a system with an optimization server. Embodiment 200 illustrates hardware components that may deliver the operations described in embodiment 100, as well as other embodiments. Embodiment 200 illustrates a network environment in which the various components may operate.

Various devices may be connected via a Network 140 to communicate with each other. The Network 140 may be a local area network, wide area network, the Internet, or some other network.

The diagram of FIG. 2 illustrates functional components of a system in a network arrangement. In some cases, the component may be a hardware component, a software component, or a combination of hardware and software. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Network 140 connects to one or more Processing Devices $101_{1\ldots n}$, which are connected to one or more Remote Catalog Systems $130_{1\ldots n}$ and one or more Remote Manager Systems $120_{1\ldots n}$. Workflows executing on each Processing Devices $101_{1\ldots n}$ can be configured to be managed by zero or more Manager Systems $120_{1\ldots n}$ while using catalog modules from zero or more Remote Catalog Systems $130_{1\ldots n}$.

Module Format

Figure 3A:
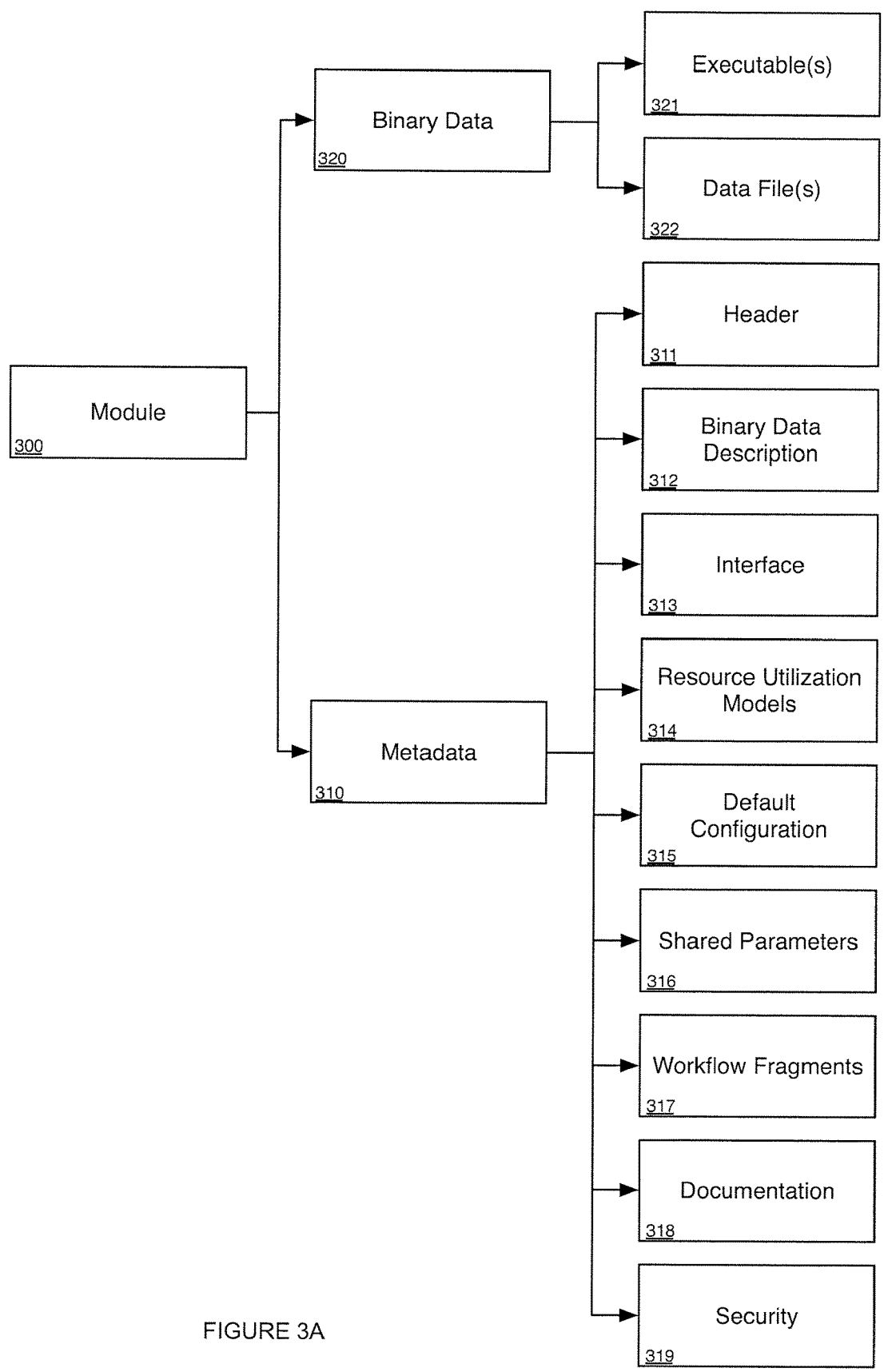
FIG. 3A is a block diagram of the format of a module stored and indexed in a module catalog in an embodiment of the system.

In order to enable optimization of Workflows FIG. 1 108 in response to changes in resource availability and to enable the rapid insertion of new and updated capabilities into Workflows FIG. 1 108, data and code functions are stored in specially formatted Modules 110, 112, 133. FIG. 3A is a hierarchical diagram that describes an embodiment of the constituent components of the Modules 110, 112, 133 of this system.

A Module 300 consists of Binary Data 320 and Metadata 310. Binary Data 320 consists of one or more computer files represented by a sequence of bytes. These files can consist of Executable code 321 in various formats or Data 322. A Metadata record 310 describes the binary content. It consists of at least a Header 311, descriptions of the Binary content 312, descriptions of the Interface to the binary content 313, Models 314 related to how the binary data 320 content utilizes resources, such as network, memory, and the like, when deployed and executing on a Processing Device 101, and a set of Default Configurations 315. A Default Configuration 315 consists of a valid set of values for each Configuration Options 333 defined in the Interface 313. Shared Parameters 316, Workflow Fragments 317, Module Documentation 318, and Security 319 Features can also be included.

The Header 311 provides the entry point into the Metadata 310 and high level information, such as the name of the Module 300, dependencies, software licenses associated with the module, and the like.

The Binary Data Description 312 enables associated Binary Data 320 to be located. The Default Configuration 315 provides one or more sets of initial conditions that the Module Manager 109 can utilize when deploying a Local Archived Module 112 or Remote Archived Module 133 to a Workflow 108.

Shared Parameters 316 enables Deployed Modules 110 to synchronize data across Workflow 108 and Deployed Modules 110 instances when shared data is required. This is required to do things like calculating a total word count on a Workflow 108 that is distributed across a grid consisting of multiple Processing Devices 101 and Deployed Module 110 instances. Shared Parameters 316 consists of a list of shared data structures, information on the scope of the sharing, data type information, and the like.

Workflow Fragments 317 enables a Deployed Modules 110 to predefine a series of processing steps. This reduces the complexity of Workflow 108 development and enables Deployed Modules 110 to consist of smaller processing steps that can be combined to create larger processing step. This vastly improves the ability to reuse modules while enabling more efficient module execution. Workflow Fragments 317 consists of a set of module references, definitions on the links between Deployed Modules 110, and conditionals that define a set of processing actions.

Security 319 Features include features for checksums, cryptographic keys, required permissions, network configurations, required processing device configurations, and the like.

Figure 3B:
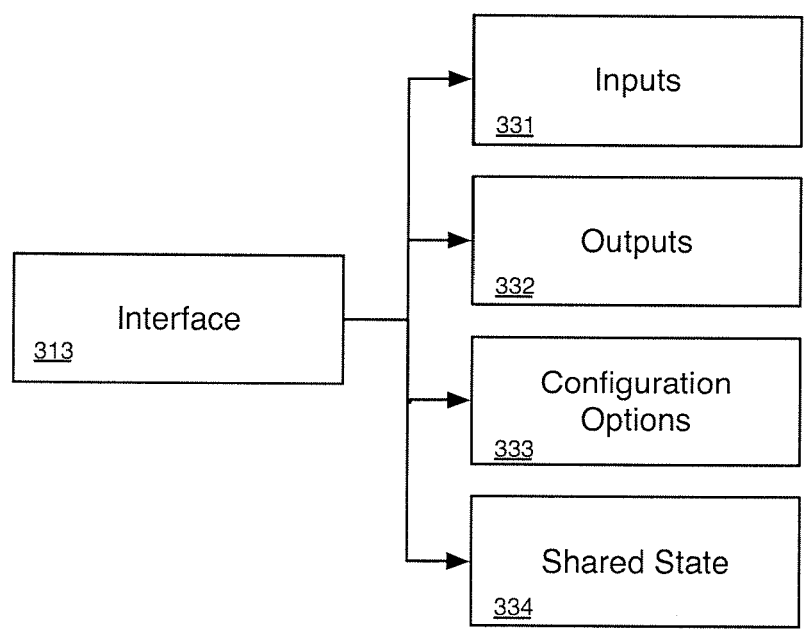
FIG. 3B is a block diagram of the interface block of FIG. 3A.

The Interface component 313 of the Metadata 310 component is detailed in FIG. 3B. The Interface 313 describes how the Module Manager 109 exposes Deployed Module 110 functionality to a Workflow 108. For a code Module 110, 112, 133, it consists of at least of a description of the Input data format 331, a description of the Output data format 332, available Configuration Options 333, and other interface components, such as variables shared between modules 334. The Configuration Options 333 consists of configurations used by the Module 110, 112, 133 at startup and configuration options exposed during runtime. The runtime exposed parameters enable optimization when combined with mathematical Resource Utilization Models 314.

Figure 3C:
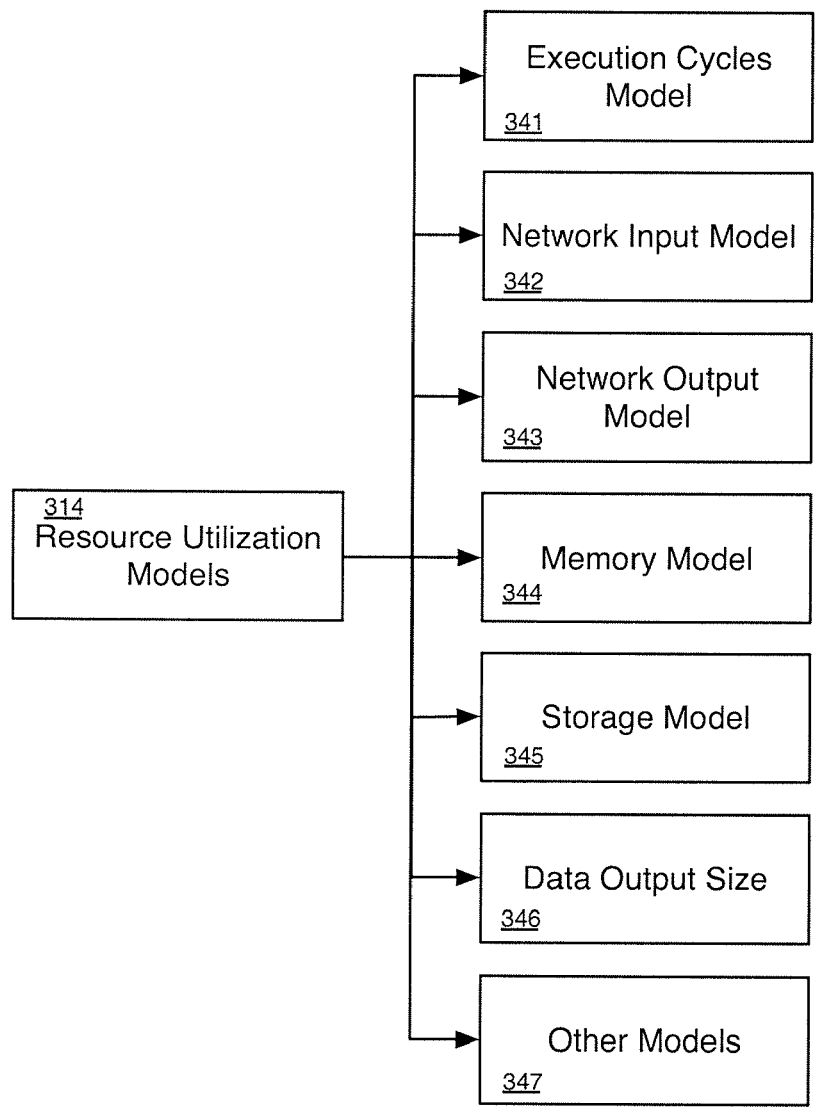
FIG. 3C is a block diagram of the resource utilization models block of FIG. 3A.

FIG. 3C depicts Resource Utilization Models 314 that can be attached to a Deployed Module 110. These consist of mathematical operations (e.g. algorithms) with substitutable variables, including the rate and size of data being passed to a Deployed Module 110, any runtime exposed parameters, remaining resources available, as well as other parameters exposed by the optimizer running within the Module Manager 109. These Models 314 are function specific, thus if a Deployed Module 110 contains multiple functional operations, a Deployed Module 110 will contain Models 314 of the same types for each operation. Resource Models 314 can include Execution Cycle count 341, Network Input and Output usage 342, 343, Memory consumed 344, Storage consumed 345, size of Data Output produced per input 346, and Other resources consumed 347, such as Graphical Processing Units (GPUs), Field Programmable Gate Arrays (FPGAs), cryptographic hardware, custom Application Processing Units (APUs), and the like.

Workflow Optimization

Figure 4:
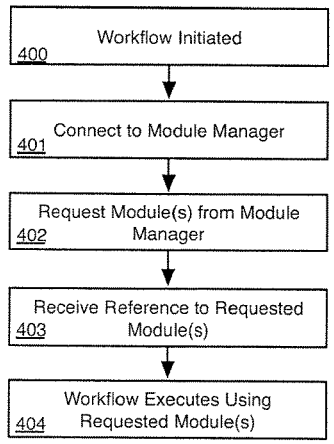
FIG. 4 is a flow diagram illustrating a workflow running on a processing device obtaining a module in accordance with an embodiment of the system.
Figure 5:
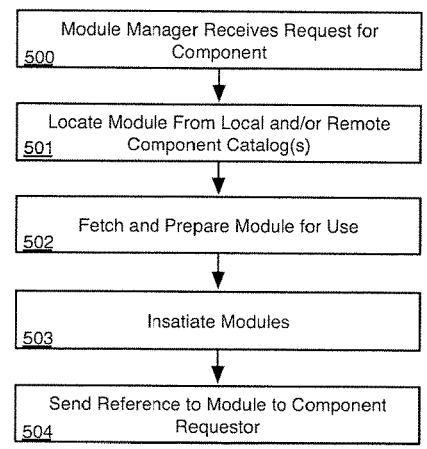
FIG. 5 is a flow diagram illustrating a module manager on a processing device responding to a workflow request for a module in accordance with an embodiment of the system.
Figure 6:
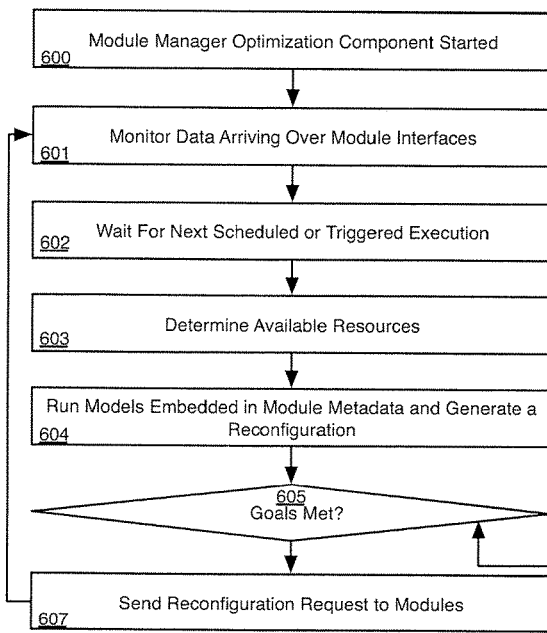
FIG. 6 is a flow diagram illustrating an optimization component on a processing device which uses mathematical resource utilization models to tune system execution in accordance with an embodiment of the system.

FIGS. 4, 5, and 6 are flow diagrams that depict an embodiment of a high level software flow that enables Workflows 108 to locate and utilize code and data Modules 112, 110 while enabling those Modules 112, 110 to be optimized by the Module Manager 109 to enable a set of high level system goals to be met. System goals can include not exceeding system resources, prioritizing the use of limited system resources, and the like.

FIG. 4 is a flow diagram that depicts an embodiment of how a Workflow 108 accesses Deployed Modules 110. This software functionality can be implemented within the Workflow Technology 107 after the Workflow Manager 106 starts an instance of a Workflow 108. At Step 400, a Workflow 108 is instantiated on top of a Workflow Technology 107. At step 401, the Workflow 108 connects to the Module Manager 109 and at step 402 requests the use of one or more Archived Modules 112. The Workflow 108 then waits for the request to be fulfilled at step 403 with a reference that provides access the requested Deployed Modules 110. This reference enables a Workflow 108 to access the data, configuration, or functions of a Deployed Module 110. At step 404, the Workflow 108 is then executed using the requested Deployed Modules 110.

FIG. 5 is a flow diagram that depicts an embodiment of how Module Managers 109 makes Modules 112, 110 available to Workflows 108. This software functionality is implemented within the Module Manager 109 and is initiated when a Workflow 108 requests the use to one or more Archived Modules 112. At step 500, a Workflow 108 sends a request for one or more Archived Modules 112. At step 501, Archived Modules 112, 133 are located from either a local Module Catalog index 111 or via a network request to a peer Module Catalog index 111 or a remote Module Catalog index 132. The specific method and order of these requests will differ between embodiments of this system. At step 502, one or more Archived Modules 112, 133 that have been located and are prepared for use. The specific method for this preparation will differ between embodiments of this system and can include deploying within the Workflow's 108 memory space, instantiating an execution container with limited system privileges, verifying that the configuration or Interface 313 are compatible, running Resource Utilization Models 314 to ensure system goals are able to be met, or the like. At step 503 the Archived Modules 112 are instantiated within their prepared environment as Deployed Modules 110 and at step 504 one or references are returned to the requesting Workflow 108 that enables access the Module's 110 data, configuration, or functions.

FIG. 6 is a flow diagram that depicts an embodiment of how a set of Deployed Modules 110 have their configurations updated to respond to changing system conditions. This software functionality is implemented within the Module Manager 109 in one embodiment. In some embodiments, the flow described in FIG. 6 can also be executed on a plurality of Processing Devices 101 in conjunction with flow execution on each Processing Device 101 utilizing a Remote Module Manager 121 that can interface with a Remote Workflow Manager 122. At step 600, the optimization component starts when it is instantiated by the Module Manager 109. At step 601, data is monitored as it flows between each Deployed Module 110 and its associated Workflow 108. The specific data monitored will differ between embodiments of this system but can include times each Deployed Module 110 function is accessed, the content and character of data transferred to and from the Deployed Module 110 during each access, the latency of each access, processing time and number of instructions for each access, the system resources consumed for each access, Workflow 108 driven changes to Deployed Module 110 configuration, frequency of use, and the like.

At step 602, the optimizer waits for the next scheduled execution or by a trigger. Triggers can include new Modules 112, 110 being deployed, Network 140 bandwidth reduced, memory exceeded, and the like. At step 603, available system resources and the current Deployed Module 110 configurations are determined by collecting information from the Operating System 105, the Workflow Managers 106, and the Module Managers 109. Information consists of measured, defined, and estimated values. Measured values include latency of Network 140 transmissions, latency of Module 110 executions, power utilization, memory utilization, and the like. Defined values include minimum and/or processing and memory reservations for the Workflow 108 or Workflow Technologies 107. Estimated values include rate of memory growth, rate of Network 140 transmission, or rate of Deployed Module 110 data throughput. At step 604, the optimizer utilizes models embedded in each Deployed Module 110 in conjunction with one or more optimization strategies to generate a set of changes to each Deployed Module's 110 configuration. These optimization strategies include minimizing overall latency of data delivery while maximizing the delivery of useful data over a Network 140, modifying overall fidelity of each kind of data transmitted to maximize useful data throughput, maximizing Processing Device 101 battery life, and the like.

At decision block 605, the content of this reconfiguration is tested to ensure that it meets operational goals. If the goals are not met, at step 606 models are utilized to generate another reconfiguration that is tested to ensure that it meets operational goals. At step 607, after goals are met at 605, a reconfiguration request is sent to each Deployed Module 110 requiring reconfiguration using before continuing to step 601 via a request sent to the Module Manager 109, which notifies each Workflow 108 and Deployed Module 110 of the request, creating an execution loop that continues until the Module Manager 109 terminates this processing flow.

Distributed Optimizable Processes on Computing Agents System

Figure 7:
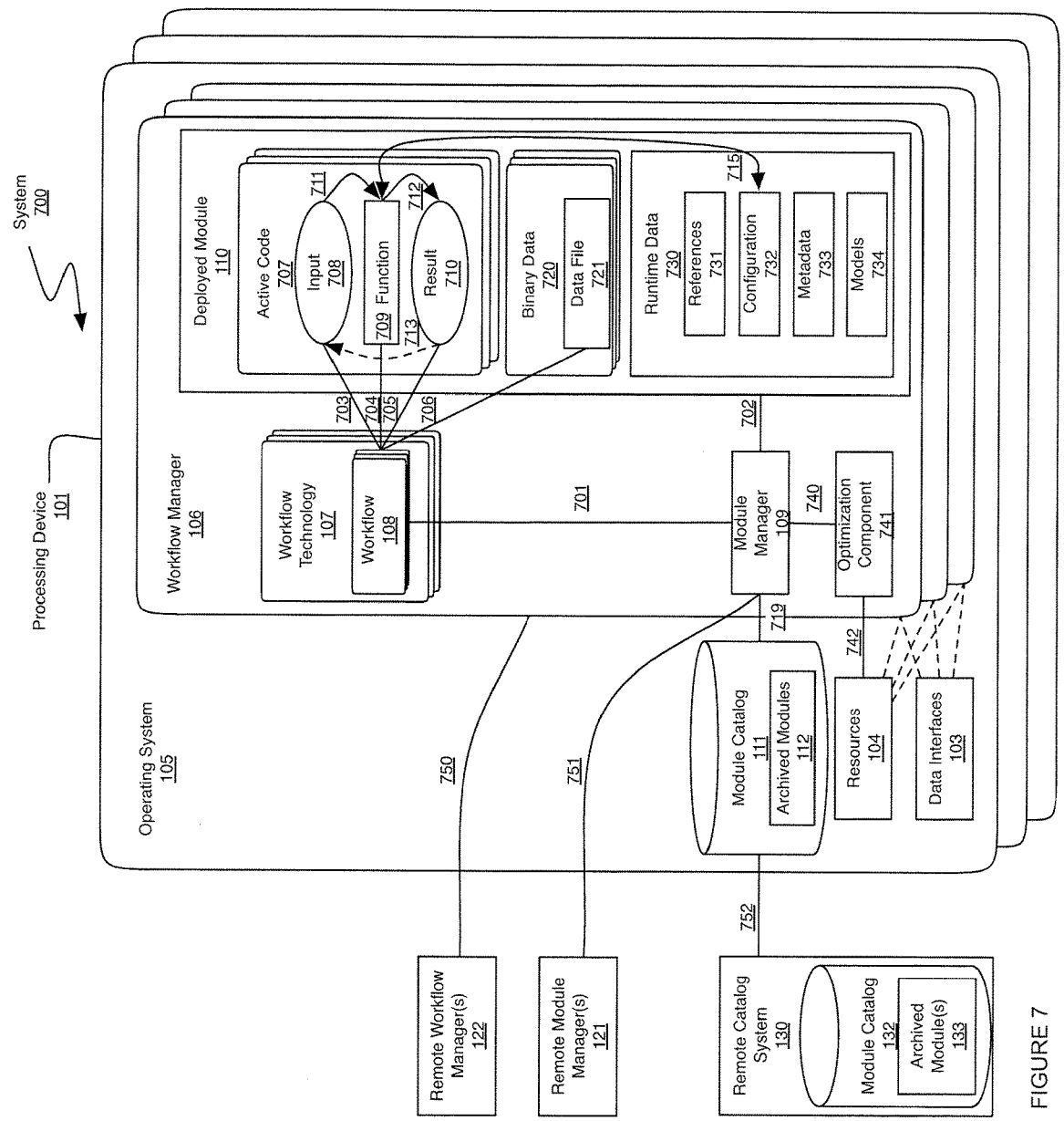
FIG. 7 is a diagram illustrating an embodiment of the system.

FIG. 7 is a diagram illustration of an embodiment 700 that illustrates a system that implements distributed, optimizable processes on computing agents system. Embodiment 700 illustrates a mechanism by which distributed workflows utilize optimizable modules on processing devices 101 as used in a grid processing system. The device contains one or more Operating Systems 105, Data Interfaces 103, Workflow Managers 106, Workflow Technologies 107, Workflows 108, Module Managers 109, Deployed Modules 110, Module Catalogs 111 that store and index Archived Modules 112, and consumable system Resources 104.

Workflows 108 consume system Resources 104 (Memory, Storage, Network, and the like) and use deployed data and code Modules 110 that were loaded using a Module Catalog 111 that stores archived versions of Modules 112. Module Manager 109 provides an interface that orchestrates the interactions between Deployed Modules 110 and Workflows 108 while managing and monitoring module execution, configurations, and interfaces.

After a device Workflow 108 has been started at the request of a Remote Workflow Manager 122 via Request Interface 750 and has requested the use of one or more Archived Modules 112 from the Module Manager 109 via a Request Interface 701, the Module Manager deploys the requested Archived Modules 112 as Deployed Modules 110 via Request Interface 719 and returns references that the workflow can use to access deployed Active Code 707 and Binary Data 720 via the Request Interface 701. Archived Modules 133 can also be located from a Module Catalog 132 on a Remote Catalog System 130 via a Network Request Interface 752 or from a peer Processing Device 101. The Workflow 108 can also request Module Metadata 733 and other Runtime Data 730 created when the Module Manager 109 deploys a module as a Deployed Module 110 via Request Interface 701. The Module Manager 109 then uses Request Interface 702 to access Runtime Data 730. Runtime Data 730 for a Deployed Module 110 includes code and data References 731, active Configurations 732, module Metadata 733 as described in FIG. 3A, code resource Models 734, and the like. The Module Manager also monitors code and data usage via Request Interface 702.

Workflow 108 uses References 731 obtained over a Request Interface 701 to access Deployed Module 110 Active Code 707 and Binary Data 720. To use a module Function 709 deployed as Active Code 707, the Workflow 108 uses a Reference 731 to send a unit of data to the Function 709 via a Data Interface 703. This unit of data is captured as input 708, processed by the Function 709 via Data Interface 711, has a Result 710 prepared via Data Interface 712, and returns the result to the Workflow 108 via a Data Interface 705. If a Data Interface requires the execution of multiple Active Code 707 Functions 709 before returning, Data Interface 713 can be used to process multiple Functions in series before returning a final Result 710 to the Workflow 108 via Data Interface 705. Functions 709 can utilize Configurations 732 stored as Runtime Data 730 via Data Interface 715. A Workflow 108 can obtain information, about a Function 709 via a Request Interface 704. When utilizing Binary Data 720, the Workflow 108 uses a Data Interface 706 combined with a Reference 731 to one or more Data Files 721.

While Workflow 108 is executing Deployed Module 110 using Active Code 707 or Binary Data 720 and updating Runtime Data 730, the Optimization Component 741 monitors System Resources 104 via a Request Interface 742 and Workflow Manager 106 resource allocations, monitors Active Code 707 usage data and module Runtime Data 730 via Request Interface 740 from the Module Manager 109, and runs Resource Utilization Models 734 to calculate estimated resource utilization requirements. Optimization Component 741 uses this information combined with operational goals and Module Metadata 733 for all Deployed Modules 110 associated with a Workflow Manager 106 to manage Resources 104. Management is accomplished by sending proposed changes to module configuration parameters via a Request Interface 740 to the Module Manager 109, which notifies the Workflow 108 of the updated Configuration via Request Interface 701. Each proposed configuration change that the Workflow 108 accepts is merged into the Deployed Module's 110 active Configuration 732 and made available to Active Code 707 Functions 709. The Optimization Component 741 will also notify the Workflow Manager 106 of requested changes to Resource 104 allocations.

A Remote Module Manager 121 can remotely access a Module Manager 109 via a Request Interface 751 to view and update Deployed Module 110 Runtime Data 730 and to monitor Deployed Module 110 and Module Manager 109 telemetry.

What is claimed is:

1. A computer-implemented method to implement software workflow processing in distributed computer systems comprising:
   delivering software modules to a workflow executing on a processing entity, wherein each delivered software module comprises of metadata, configurations, interfaces, or mathematical resource utilization models of how the delivered software module is expected to consume system resources and one or more of the following:
   data;
   metadata;
   workflow fragments;
   code comprising of one or more functions;
   analysing or applying the mathematical resource utilization models given a current configuration or available compute system resources and identifying a set of configurations that enables a set of operational goals;
   transmitting the set of configurations to the delivered software modules or workflow;
   monitoring system resources or operational goals, and
   repeating the analysing or applying and transmitting on a scheduled or triggered basis.

2. The method of claim 1, the delivered software module further comprising: an interface of data formats accepted and produced by each contained function.

3. The method of claim 1, the computer systems further comprising: staging and deploying the delivered software module into a data workflow at each processing device based on the metadata, configurations, interfaces, or mathematical resource utilization models.

4. The method of claim 1, the computer systems further comprising: using an orchestration agent to expose a workflow to the delivered software module, the delivered software module being deployed on computer system with normal or modified execution privileges.

5. The method of claim 4, the orchestration agent further comprises execution of the mathematical resource utilization models to estimate required processing device resources for the delivered software module execution.

6. The method of claim 4, the orchestration agent further comprising of: comparing the difference between any combinations of modeled resources consumed, actual resources consumed, or quality of service targets during execution to update module configurations.

7. The method of claim 1, the monitoring and identifying further comprising inputs processed by the delivered software module.

8. The method of claim 7, the monitoring and identifying further comprising measurement of system resource utilization of the delivered software module when processing the inputs.

9. The method of claim 8, the measurement of resource utilization being processing time.

10. The method of claim 8, measurement of resource utilization being number of instructions processed.

11. The method of claim 1, the monitoring and identifying further comprising results returned by the delivered software module.

12. The method of claim 1, the monitoring and identifying further comprising measurement of the frequency of delivered software module function use or changes to delivered software module configurations.

13. The method of claim 1, the configurations being collected from a plurality of devices executing delivered software module code.

14. The method of claim 13, the plurality of devices executing the delivered software module in parallel on each device.

15. The method of claim 1, the mathematical resource utilization models comprising estimated execution cycles required to process a given input for each function in the delivered software module.

16. The method of claim 1, the mathematical resource utilization models comprising estimated network input to process a given input for each function in the delivered software module.

17. The method of claim 1, the mathematical resource utilization models comprising estimated network output to process a given input for each function in the delivered software module.

18. The method of claim 1, the mathematical resource utilization models comprising estimated memory needed to process a given input for each function in the delivered software module.

19. The method of claim 1, the mathematical resource utilization models comprising estimated storage needed to process a given input for each function in the delivered software module.

20. The method of claim 1, the mathematical resource utilization models comprising estimated size of output generated when processing a given input for each function in the delivered software module.

21. A system comprising: a computer processor;
an orchestration agent operating on the computer processor, the orchestration agent that:
delivers software modules to a workflow executing on a processing entity, wherein each delivered software module comprises of metadata, configurations, interfaces, or mathematical resource utilization models of how the delivered software module is expected to consume system resources and one or more of the following:
data;
metadata;
workflow fragments;
code comprising of one or more functions;
analyses or applies the mathematical resource utilization models given a current configuration or available compute system resources and identifies a set of configurations that enables a set of operational goals;
transmits the set of configurations to the delivered software modules or workflow;
monitors system resources or operational goals, then
repeating the analyses or applies and the transmits on a scheduled or triggered basis.

22. The system of claim 21, the software module being delivered by the orchestration agent being a pull mechanism that pulls a software module from a peer processing device.

23. The system of claim 21, the software module being delivered by the orchestration agent being a push mechanism that pushes a software module to a peer processing device.

24. The system of claim 21, the orchestration agent sends delivered software module telemetry to a peer processing device via a push mechanism.

25. The system of claim 21, the orchestration agent sends delivered software module telemetry to a peer processing device via a pull mechanism.

* * * * *